United States Patent
Ma et al.

(10) Patent No.: US 12,506,527 B2
(45) Date of Patent: *Dec. 23, 2025

(54) COEXISTENCE SCHEMES FOR WIRELESS COMMUNICATION AND SENSING

(71) Applicant: ZTE Corporation, Shenzhen (CN)

(72) Inventors: Yihua Ma, Shenzhen (CN); Zhifeng Yuan, Shenzhen (CN); Guanghui Yu, Shenzhen (CN); Shuqiang Xia, Shenzhen (CN); Liujun Hu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 1 day.

This patent is subject to a terminal disclaimer.

(21) Appl. No.: 18/627,088

(22) Filed: Apr. 4, 2024

(65) Prior Publication Data

US 2024/0250734 A1   Jul. 25, 2024

Related U.S. Application Data

(63) Continuation of application No. PCT/CN2021/132958, filed on Nov. 25, 2021.

(51) Int. Cl.
*H04B 7/06* (2006.01)
*H04B 7/024* (2017.01)

(52) U.S. Cl.
CPC ........... *H04B 7/0678* (2013.01); *H04B 7/024* (2013.01)

(58) Field of Classification Search
CPC ........ G01S 7/006; G01S 13/284; G01S 13/34; H04B 7/0678; H04B 1/69; H04B 1/707;

(Continued)

(56) References Cited

U.S. PATENT DOCUMENTS 11,899,123 B2 * 2/2024 Kalkunte ............. H04B 7/0639
12,044,769 B2 * 7/2024 Yehezkel ............. G01S 13/343

(Continued)

FOREIGN PATENT DOCUMENTS

CN   108293035 A   7/2018
CN   110169172 A   8/2019

(Continued)

OTHER PUBLICATIONS

International Search Report and Written Opinion for International Application No. PCT/CN2021/132958, mailed on Jul. 28, 2022, 7 pages.

(Continued)

*Primary Examiner* — Dac V Ha
(74) *Attorney, Agent, or Firm* — Perkins Coie LLP

(57) ABSTRACT

Techniques are described for transmission and/or reception of signal structure designs for joint communications and sensing. An example wireless communication method includes transmitting, by a wireless device, a waveform that includes a signal structure having one or more time resources or one or more frequency resources, where the signal structure includes a plurality of data signals, where the signal structure includes a plurality of sensing signal configured to reflect from an object in an area where the wireless device is operating, and where, before the transmitting, the plurality of data signals are spread using different spreading codes than that used to spread the plurality of sensing signals.

20 Claims, 13 Drawing Sheets

Communications    Sensing

(58) Field of Classification Search
CPC . H04B 7/024; H04B 2001/6912; H04J 11/00; H04J 13/0025; H04J 13/0029; H04J 13/004; H04L 5/026; H04W 64/006
See application file for complete search history.

(56) References Cited

U.S. PATENT DOCUMENTS

| | | | |
|---|---|---|---|
| 2010/0061398 | A1 | 3/2010 | Stadelmeier et al. |
| 2021/0011156 | A1 | 1/2021 | Mody et al. |
| 2021/0076367 | A1 | 3/2021 | Bayesteh et al. |
| 2021/0286064 | A1 | 9/2021 | Braun et al. |
| 2024/0430649 | A1* | 12/2024 | Liu ................. H04W 28/24 |
| 2025/0150860 | A1* | 5/2025 | Park ................. G01S 7/006 |

FOREIGN PATENT DOCUMENTS

| | | |
|---|---|---|
| CN | 112763985 | 5/2021 |
| CN | 112763985 A | 5/2021 |
| CN | 113315729 A | 8/2021 |
| WO | 2023092365 A1 | 6/2023 |
| WO | 2023092366 A1 | 6/2023 |

OTHER PUBLICATIONS

Zhu, F., "Overview of Vehicle Radar-Communication System," ZTE Technology Journal, No. 03, Jun. 25, 2018, 7 pages.
International Search Report and Written Opinion for International Application No. PCT/CN2021/132956, mailed on Jun. 21, 2022, 10 pages.
Extended European Search Report for co-pending EP Appl. No. 21965104.9, dated Dec. 19, 2024, 11 pages.
Chen et al "Code-Division OFDM Joint Communication and Sensing System for 6G Machine-Type Communication" IEEE Internet of Things Journal, vol. 8, No. 15, Aug. 1, 2021, 13 Pages.
EPO, Communication pursuant to Article 94(3) EPC for European Application No. 21 965 103.1, mailed on Apr. 23, 2025, 5 pages.
Andersson, H., "Joint communication and sensing in 6G networks," Ericsson Research, Oct. 2021, 15 pages.
Moerman, K., "Joint Communication and Sensing in 6G Networks," NXP, Nov. 2021, 6 pages.
EPO, Extended European Search Report for European Application No. 21965103.1, mailed on Oct. 14, 2024, 10 pages.
Zhang et al., "Enabling Joint 1-15 Communication and Radar Sensing in Mobile Networks—A Survey," IEEE Communications Surveys & Tutorials, vol. 24, No. 1, pp. 306-345, Oct. 2021.
Zhang et al., "An Overview of Signal Processing Techniques for Joint Communication and Radar Sensing," arxiv.org, Cornell University Library, 1-18, Feb. 2021.
Wild et al., "Joint Design of Communication and Sensing for Beyond 5G and 6G Systems," IEEE Access, vol. 9, pp. 30845-30857, Feb. 2021.
Sharma, S. et al., "Multicarrier DS-CDMA Waveforms for Joint Radar-Communication System," 2020 IEEE Radar Conference (6 pages).
Chen, X. et al., "Code-Division OFDM Joint Communication and Sensing System for 6G Machine-Type Communication," IEEE Internet of Things Journal, vol. 8, No. 15, Aug. 1, 2021 (13 pages).
Office Action for Japanese Patent Application No. 2024-523431, mailed Mar. 17, 2025 (7 pages).

* cited by examiner

DFT matrix

$$C_M = \frac{1}{\sqrt{M}} \begin{bmatrix} e^{-j2\pi\frac{0\cdot 0}{M}} & e^{-j2\pi\frac{0\cdot 1}{M}} & \cdots & e^{-j2\pi\frac{0\cdot(M-1)}{M}} \\ e^{-j2\pi\frac{1\cdot 0}{M}} & e^{-j2\pi\frac{1\cdot 1}{M}} & \cdots & e^{-j2\pi\frac{1\cdot(M-1)}{M}} \\ \vdots & \vdots & \vdots & \vdots \\ e^{-j2\pi\frac{(M-1)\cdot 0}{M}} & e^{-j2\pi\frac{(M-1)\cdot 1}{M}} & \cdots & e^{-j2\pi\frac{(M-1)(M-1)}{M}} \end{bmatrix}$$

A variant

$$C'_M = \frac{1}{\sqrt{M}} \begin{bmatrix} e^{-j2\pi\frac{0\cdot 0}{M}} \cdot e^{j\pi\frac{0}{M}} & e^{-j2\pi\frac{0\cdot 1}{M}} \cdot e^{j\pi\frac{1}{M}} & \cdots & e^{-j2\pi\frac{0\cdot(M-1)}{M}} \cdot e^{j\pi\frac{M-1}{M}} \\ e^{-j2\pi\frac{1\cdot 0}{M}} \cdot e^{j\pi\frac{0}{M}} & e^{-j2\pi\frac{1\cdot 1}{M}} \cdot e^{j\pi\frac{1}{M}} & \cdots & e^{-j2\pi\frac{1\cdot(M-1)}{M}} \cdot e^{j\pi\frac{M-1}{M}} \\ \vdots & \vdots & \vdots & \vdots \\ e^{-j2\pi\frac{(M-1)\cdot 0}{M}} \cdot e^{j\pi\frac{0}{M}} & e^{-j2\pi\frac{(M-1)\cdot 1}{M}} \cdot e^{j\pi\frac{1}{M}} & \cdots & e^{-j2\pi\frac{(M-1)(M-1)}{M}} \cdot e^{j\pi\frac{M-1}{M}} \end{bmatrix}$$

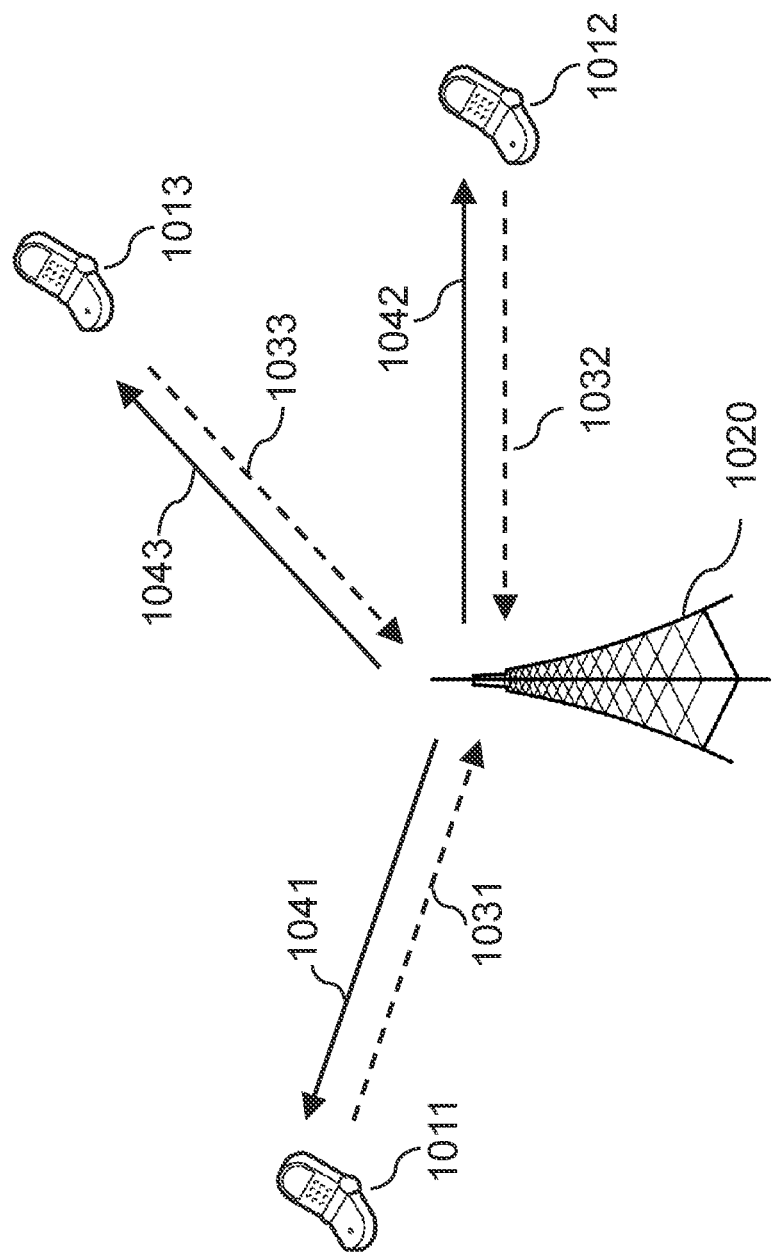

Transmitting, by a wireless device, a waveform that includes a signal structure having one or more time resources or one or more frequency resources, where the signal structure includes a plurality of data signals, where the signal structure includes a plurality of sensing signal configured to reflect from an object in an area where the wireless device is operating, and where, before the transmitting, the plurality of data signals are spread using different spreading codes than that used to spread the plurality of sensing signals

Receiving, by a wireless device, a reflected waveform that is reflected from an object in an area where the wireless device is operating, where the reflected waveform comprises at least some of a plurality of sensing signals in a signal structure transmitted by the wireless device or by another wireless device, and where, prior to the receiving, the wireless device transmits in the signal structure a plurality of data signals that are spread using different spreading codes than that used to spread the plurality of sensing signals

COEXISTENCE SCHEMES FOR WIRELESS COMMUNICATION AND SENSING

CROSS REFERENCE TO RELATED APPLICATIONS

This patent document is a continuation of and claims benefit of priority to International Patent Application No. PCT/CN2021/132958, filed on Nov. 25, 2021. The entire content of the before-mentioned patent application is incorporated by reference as part of the disclosure of this application.

TECHNICAL FIELD

This disclosure is directed generally to digital wireless communications.

BACKGROUND

Mobile telecommunication technologies are moving the world toward an increasingly connected and networked society. The rapid growth of wireless communications and advances in technology has led to greater demand for capacity and connectivity. Other aspects, such as energy consumption, device cost, spectral efficiency, and latency can also be important to meeting the needs of various communication scenarios. In comparison with the existing wireless networks, next generation systems and wireless communication techniques will need to support a much wider range of use-case characteristics and provide a more complex and sophisticated range of access requirements and flexibilities.

SUMMARY

Techniques are disclosed for co-existence schemes for joint communications and sensing for wireless technologies.

A first example wireless communication method, comprises transmitting, by a wireless device, a waveform that includes a signal structure having one or more time resources or one or more frequency resources, where the signal structure includes a plurality of data signals, where the signal structure includes a plurality of sensing signal configured to reflect from an object in an area where the wireless device is operating, and where, before the transmitting, the plurality of data signals are spread using different spreading codes than that used to spread the plurality of sensing signals.

A second wireless communication method, comprises receiving, by a wireless device, a reflected waveform that is reflected from an object in an area where the wireless device is operating, where the reflected waveform comprises at least some of a plurality of sensing signals in a signal structure transmitted by the wireless device or by another wireless device, and where, prior to the receiving, the wireless device transmits in the signal structure a plurality of data signals that are spread using different spreading codes than that used to spread the plurality of sensing signals.

A third wireless communication method, comprises transmitting, by a wireless device, a waveform that includes a signal structure, where the signal structure includes a plurality of data signals, where the signal structure includes a plurality of sensing signals configured to reflect from an object in an area where the wireless device is operating resulting in a reflected waveform that comprises at least some of the plurality of sensing signals to be received by the wireless device, and where the plurality of data signals are spread using different spreading codes than that used to spread the plurality of sensing signals; receiving, by the wireless device, the reflected waveform; and determining, by processing the reflected waveform, one or more parameters of the object.

In some embodiments, the one or more parameters of the object include a distance between the object and the wireless device, a speed of the object, a motion period of the object, or an image of the object. In some embodiments, the signal structure comprises a plurality of sub-carriers, and a first spreading code selected for a sensing signal is different than a second spreading code selected for a data signal. In some embodiments, a plurality of spreading codes used to spread the plurality of data signals and the plurality of sensing signals are orthogonal. In some embodiments, a plurality of spreading codes used to spread the plurality of data signals and the plurality of sensing signals include a discrete Fourier transform (DFT) matrix, a Hadamard code, a discrete Hartley transform matrix, a discrete cosine transform matrix, or a diagonal matrix. In some embodiments, a plurality of spreading codes used to spread the plurality of data signals and the plurality of sensing signals are non-orthogonal.

In some embodiments, a set of spreading codes used to spread the plurality of sensing signals in a plurality of symbols are same. In some embodiments, at least one symbol for a sensing signal is associated with a first spreading code that is different than a second spreading code associated with another sensing signal in at least one other symbol. In some embodiments, a number of spreading codes used to spread the plurality of sensing signals in a plurality of symbols is same. In some embodiments, at least one symbol for a sensing signal is associated with a first number of spreading codes that are different than a second number of spreading codes associated with another sensing signal in at least one other symbol. In some embodiments, the plurality of sensing signals include frequency modulated continuous wave (FMCW), a pulse signal, or low-correlation sequences. In some embodiments, the low-correlation sequence includes an m-sequence, a pseudo-noise sequence, a gold sequence, or a Zadoff-Chu sequence. In some embodiments, the wireless device includes a network device or a communication device.

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWING

FIGS. 1 to 6 show techniques for separating communications and sensing signals by different spreading codes in the symbol.

FIG. 10 shows an example of wireless communication including a base station (BS) and user equipment (UE) based on some implementations of the disclosed technology.

FIG. 11 shows an exemplary flowchart for transmitting a waveform comprising joint communications and sensing signals.

FIG. 12 shows an exemplary flowchart for receiving a reflected waveform comprising one or more sensing signals.

DETAILED DESCRIPTION

Figure 1:
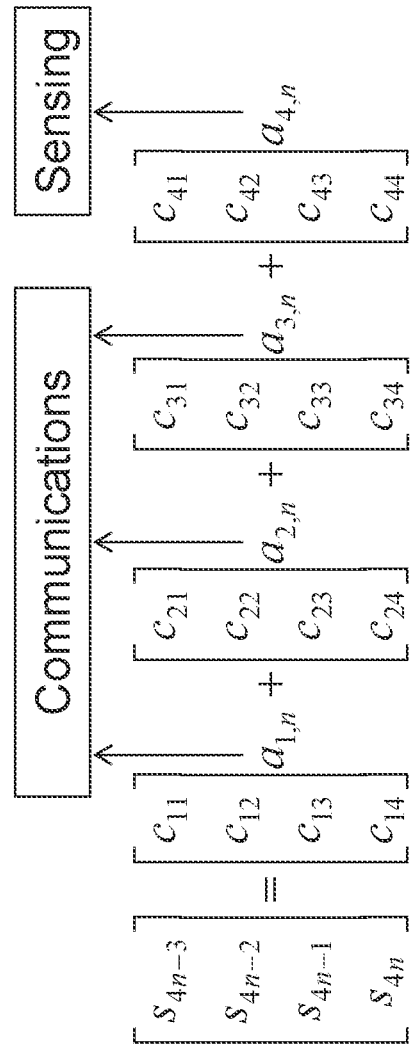

Joint communications and sensing is a promising 6G technology. But, one of the technical challenges is how to effectively and/or efficiently integrate them. Frequency-division and time-division coexistence can hardly bring a gain of integration. Directly using orthogonal frequency-division multiplexing (OFDM) to sense requires complex in-band full-duplex (FD) to cancel the self-interference (SI). To solve at least these technical problems, this patent document proposes example coexistence schemes that can, in some embodiments, increase spectrum efficiency and can get rid of the requirement of full-duplex.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G or 6G terminology is used for the sake of clarity of explanation, but the techniques disclosed in the present document are not limited to 5G or 6G technology only, and may be used in wireless systems that implemented other protocols.

I. Introduction 6G is going to not only evolve in terms of spectral efficiency, latency, and connectivity but also seek to provide beyond-communications services. Joint communications and sensing (JCS) can provide sensing services through the communications devices. The RF convergence of these two functions (i.e., JCS) also makes it possible to realize an efficient joint scheme to share the resources including spectrum and hardware.

Although the unified design is always preferable to save the cost, the two functions themselves have different working principles. Communications aim to get the information from the transmitted signal itself while sensing focuses on the channel information. Communications usually employ orthogonal frequency-division multiplexing (OFDM), as it provides robustness against multi-path channels, simple equalization and flexible resource allocation. In radar sensing, the widely used solution is based on frequency modulated continuous wave (FMCW) or chirp signal for its large bandwidth, simple processing scheme, and importantly, simple self-interference (SI) cancellation.

OFDM can be used to sense. The data transmission efficiency and flexibility can be ensured, and the sensing overheads can be reduced via reusing data symbols to sense. The problem is that a complex in-band full-duplex transceiver is required. As SI is much stronger than the echos, Ful-duplex usually cancels SI in multiple domains, including spatial domain, RF/analog domain and digital domain. When the multiple-input and multiple-output (MIMO) system is used, all transmit antennas generate SI, which makes the SI cancellation much more complex than the single-antenna situation.

FMCW was also considered to communicate in JCS. The simplest way is to modulate the amplitude, frequency or phase of the chirp signal, which is only for low-rate communications. OFDM chirp methods were designed to generate orthogonal FMCW signals for MIMO radar. Furthermore, Orthogonal chirp division multiplexing replaces the Fourier transform kernel in OFDM with the Fresnel transform and uses a DFT-spread-OFDM (DFT-s-OFDM) receiver. Although FMCW and OFDM are combined, these methods lose the advantages of multi-path robustness of OFDM, as well as the efficient SI suppression of FMCW.

II.(a). Embodiment 1—Sub-carrier-wise Code Spreading

As shown in FIG. 1, the communications and sensing signals are separated by different spreading codes in the symbol by a network device (e.g., base station) or a communication device (e.g., user equipment (UE)). In some embodiments, sensing signals can be transmitted by a wireless device (e.g., a network device or a communication device) with the communications (or data) signals in a waveform and at least some of the sensing signals can be reflected from one or more objects (e.g., another wireless device or building or person, etc.,) so that a reflected waveform comprising the at least some of the sensing signals can be received by the same wireless device or at least one of other wireless devices. The wireless device that receives the one or more sensing signals can use the one or more sensing signals to get the information about the environment. Examples of information about the environment can include spatial information (e.g., location(s) of one or more objects in an area where the wireless device is operating), the speed information of moving targets, the vital signals of a person (e.g., motion period of the object such as one or more times when the object is moving), the imaging information in the radio coverage (e.g., image of the object), etc. The wireless device can calculate the delay of the sensing signal(s) to determine the distance information between the wireless device and an object reflecting the sensing signal, or the wireless device can calculate the Doppler frequency of a sensing signal to determine the speed information of the object reflecting the sensing signal. The spreading is sub-carrier-wise, and in some embodiments, there are M=4 orthogonal spreading codes. In such example embodiments, the spreading is performed in the M sub-carriers if the length of the spreading code is M. Assume the total number of sub-carriers is N. Before spreading, in some embodiments, these 4 vectors with a length of N/4 can be used for communications or sensing by a network device or a communication device.

II.(b). Embodiment 2—Specific Code Set and the Technical Effect

Figure 2:
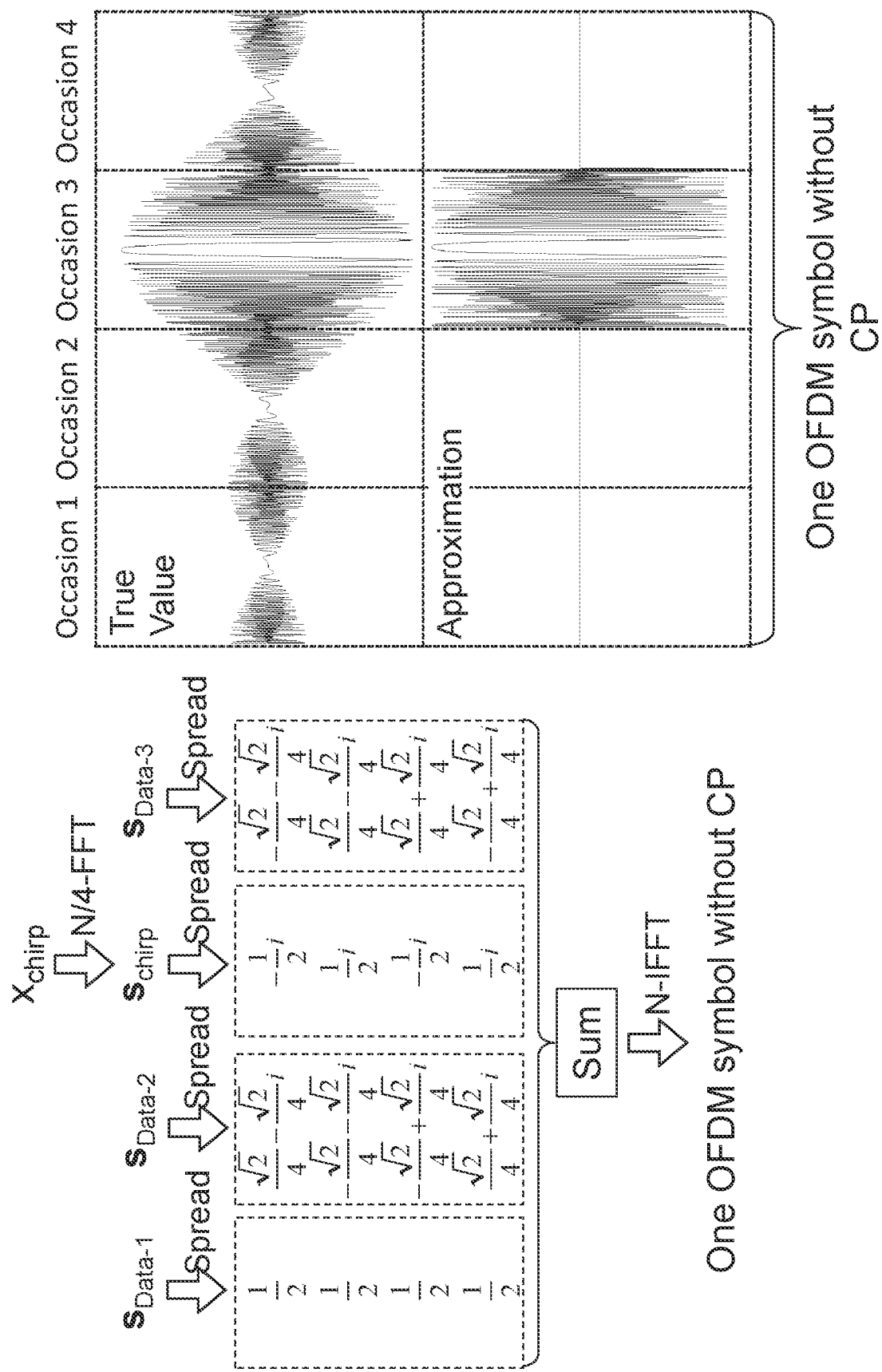

As shown in FIG. 2, the communications and sensing signals are separated by different spreading codes in the symbol. The spreading is still sub-carrier-wise, and there are M=4 orthogonal spreading codes. Assume the total number of sub-carriers is N. Before spreading, these 4 vectors with a length of N/4 can be used for communications or sensing. In this embodiment, specific spreading code set and sensing signal are used to fulfill specific technical effect. The spreading code set in FIG. 2 is a variant of DFT matrix. The sensing signal is the chirp signal, which is a normal form of FMCW signal. For example, if the code index 1 is selected for sensing, $[a_{l1}, a_{l2}, \ldots, a_{lN/4}]$ is a N/4-dimension Fourier transform of a chirp signal with N/4 sampling points. Assume that l=3. The technical effect is that the time-domain chirp signal focuses it energy in the Occasion 3, which can be approximated by a time-division chirp signal within an OFDM symbol. This approximation helps to simplify the receiver processing.

II.(c). Embodiment 3—DFT Codebook and Offset DFT Codebook

As shown in FIG. 3, the spreading code set of DFT matrix and its variant are expressed. The code length and the number of codes are M (M>1). Each column vector is a spreading code vector, and here the power of each vector is normalized to 1. The column vectors are orthogonal to each other according to the property of DFT matrix. If these column vectors are the dot products of DFT vectors and a constant vector, the orthogonality is still kept. A variant of DFT matrix is shown in the FIG. 3, and this variant has a technical effect of focusing the sensing energy as mentioned in Embodiment 2.

II.(d). Embodiment 4—Random Spreading Code in Each Symbol

Figure 4:

As shown in FIG. 4, the communications and sensing signals are separated by different spreading codes in the symbol. There are M=4 orthogonal codes. In each subframe, the wireless device that transmits the sensing signal randomly selects one spreading code to transmit the sensing signal. The random selection can be realized via a pseudo-noise algorithm or according to a pseudo-noise sequence. The remaining resources other than the resources used for the sensing signal are used for communications. In this embodiment, the code index for sensing in each symbol is uniformly random in the range from 1 to 4. Different types of sensing signals can be used in one symbol. For example, a first spreading code is used for at least one symbol for a sensing signal and a second spreading code is used for at least one other symbol for another sensing signal, where the first spreading code and the second spreading code are different. In this embodiment, m-sequence is assumed to be used as the sensing signal in one symbol.

II.(e). Embodiment 5—Multiple Spreading Codes in Each Symbol

Figure 5:
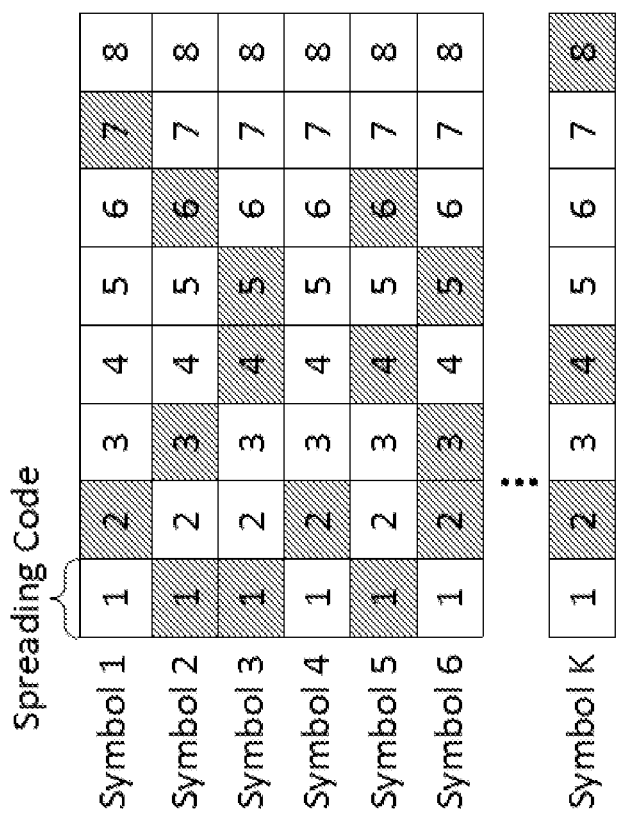

As shown in FIG. 5, the communications and sensing signals are separated by different spreading codes in the symbol. There are M=8 orthogonal codes. In each subframe, the wireless device that transmits the sensing signal randomly selects one spreading code to transmit the sensing signal. The random selection can be realized via a pseudo-noise algorithm or according to a pseudo-noise sequence. The remaining resources other than the resources used for the sensing signal are used for communications. In this embodiment, the number of spreading codes for sensing is variable (or different), and the spreading codes for sensing are randomly selected by the wireless device. For example, at least one symbol for a sensing signal is associated with a first number of spreading codes (e.g., two spreading codes for Symbol 1 shown in FIG. 5) that are different than a second number of spreading codes (e.g., three spreading codes for Symbol 3 shown in FIG. 5) associated with another sensing signal in at least one other symbol. Different types of sensing signals can be used in one symbol. In this embodiment, gold sequence is assumed to be used as the sensing signal in one symbol. In some embodiment, the number of spreading codes for sensing is can be the same for the sensing signals in the multiple symbols.

II.(f). Embodiment 6—Fixed Spreading Code in Each Symbol

Figure 6:
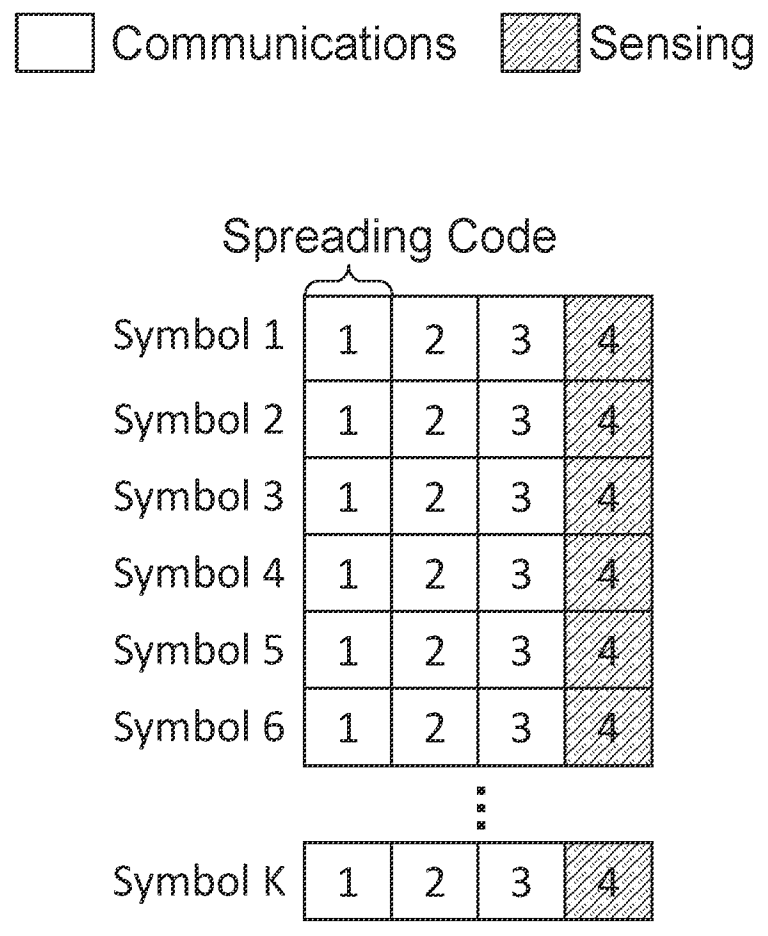

As shown in FIG. 6, the communications and sensing signals are separated by different spreading codes in the symbol. There are M=4 orthogonal codes. In each subframe, the wireless device that transmits the sensing signal randomly selects one spreading code to transmit the sensing signal. The random selection can be realized via a pseudo-noise algorithm or according to a pseudo-noise sequence. The remaining resources other than the resources used for the sensing signal are used for communications. In this embodiment, the sensing signal uses a fixed (or same) spreading code among multiple symbols. Different types of sensing signals can be used in one symbol. In this embodiment, pulse signal is assumed to be used as the sensing signal in one symbol.

II.(g). Embodiment 7—The Receiver for Sensing Signal

Figure 7:
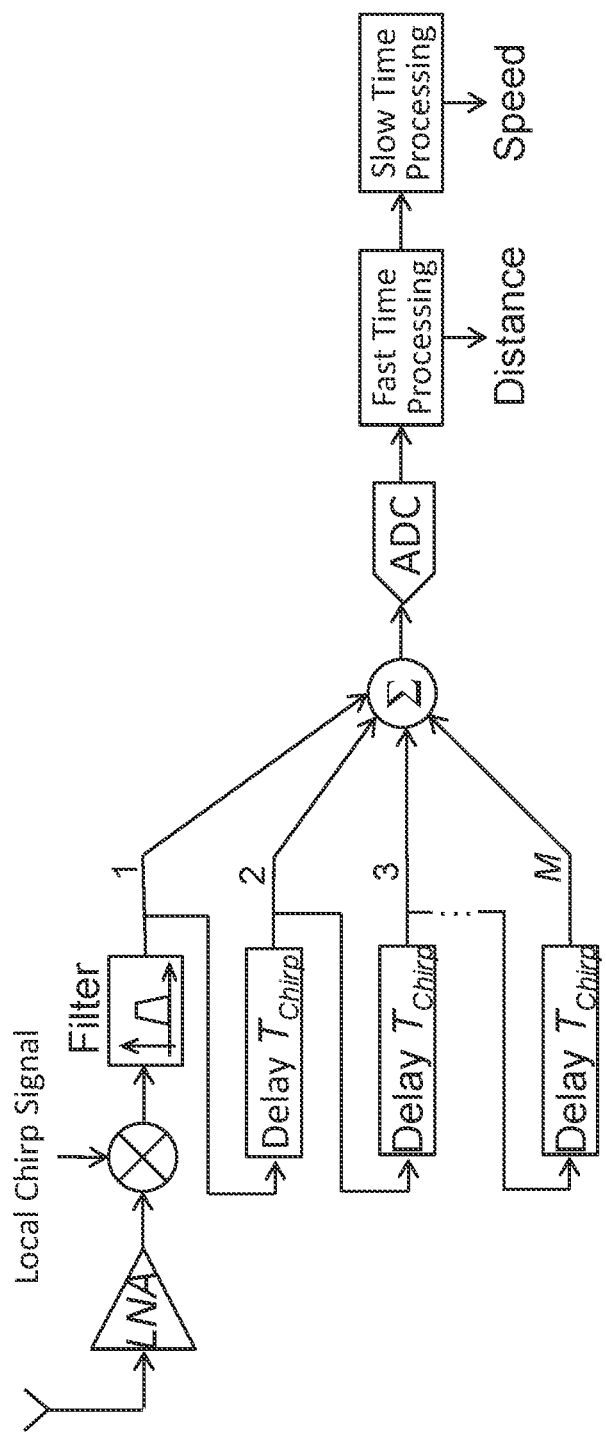
FIG. 7 shows a block diagram for a receiver for sensing signal with M=4 orthogonal codes.

FIG. 7 is a receiver for sensing signal with M=4 orthogonal codes. The main feature of the receiver is that it uses the analog processing to cancel the SI from both communication and sensing signal. The mixer and filter are used to cancel the SI of the chirp signal, which is widely used in the FMCW radar system. Moreover, the mixer automatically provides a multiplication of conjugate time-domain coefficients for chirps. Then, the filtered signal is delayed to get a sum of signals in M occasions. In the sum signal, the SI of communications signal can also be canceled via analog processing. The advantage of this receiver is that the dynamic range of the echo (or reflection) signal after analog-to-digital conversion (ADC) can be ensured for as the SI is canceled by the analog processing.

II.(h). Embodiment 8—Two Receiving Windows

Figure 8:
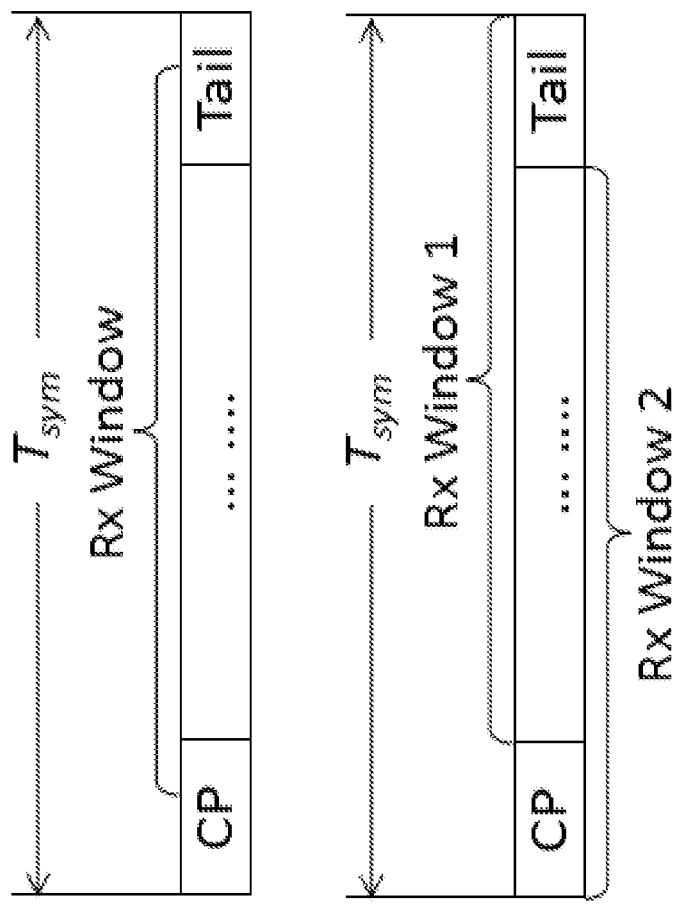
FIG. 8 shows a time-domain receiving window setting of one orthogonal frequency division multiplexing (OFDM) symbol for the sensing signal.

FIG. 8 shows the time-domain receiving window setting of one OFDM symbol for the sensing signal. The receiving window for sensing has a length same as the OFDM communications receiver as the delay and sum operations rely on the features of OFDM. There can be a single receiving window at any position. There can also be two receiving windows. One starts from the end of CP, while another starts from the start of the CP. The SI cancellation in Embodiment 7 works for both windows. And two receiving can provide extra information for sensing. Note that the two receiving windows is from the view of delay and sum operations. That is to say, the receiver can use one large receiving window to contain an entire OFDM symbol, and two sum signals are obtained from this large window, which represents the sampling at different points.

The following section describes example techniques and/or design structures described in this patent document:

- A signal structure where the sensing signal and communications signal use different spreading codes.
- The code domain spreading is at the frequency domain.
- The code domain spreading is sub-carrier-wise.
- The spreading code set is orthogonal;
- The code set is one of a DFT matrix, Hadamard code, discrete Hartley transform matrix, discrete cosine transform matrix, diagonal matrix or the variants of them.
- The spreading code set is non-orthogonal.
- The spreading codes used by sensing signal among different symbols are fixed (or same) or variant (or different (e.g., at least one symbol for a sensing signal uses a first spreading code that is different than a second spreading code used for another sensing signal in at least one other symbol)).
- The number of spreading codes used by sensing signal among different symbols is fixed (or same) or variant (or different (e.g., at least one symbol for a sensing signal is associated with a first number of spreading codes that are different than a second number of spreading codes associated with another sensing signal in at least one other symbol)).

The sensing signal can be FMCW, pulse and low-correlation sequences.

The low-correlation sequences include m-sequence, pseudo-noise sequence, gold sequence, and Zadoff-Chu sequence.

A transmitter transmits the signal structure described in this patent document.

A receiver receives the signal structure described in this patent document.

The receiver uses the analog processing to remove the SI from both communications and sensing signal.

The analog processing can be at least one of mixer, filter, delay and sum.

The receiver uses at least one receiving window for one OFDM symbol with cyclic prefix.

Figure 9:
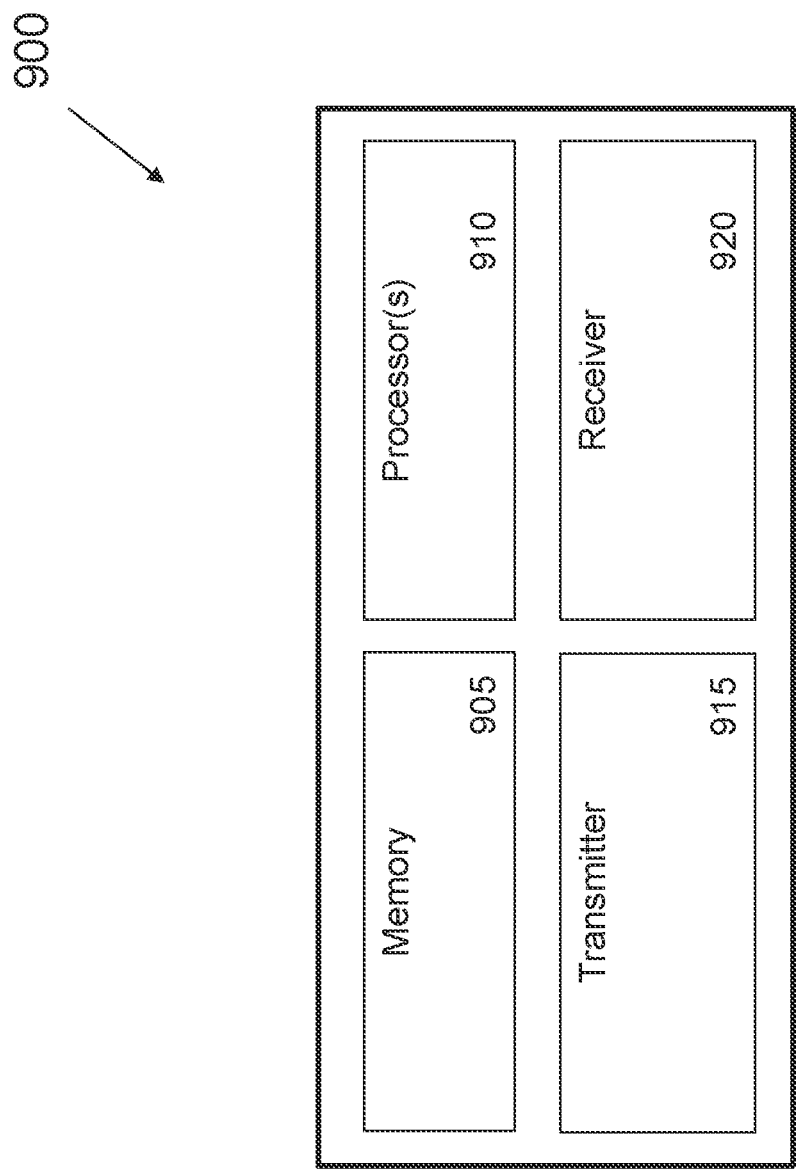
FIG. 9 shows an exemplary block diagram of a hardware platform that may be a part of a network device or a communication device.

FIG. 9 shows an exemplary block diagram of a hardware platform 900 that may be a part of a network device (e.g., base station) or a communication device (e.g., a user equipment (UE)). The hardware platform 900 includes at least one processor 910 and a memory 905 having instructions stored thereupon. The instructions upon execution by the processor 910 configure the hardware platform 900 to perform the operations described in FIGS. 1 to 8 and 10 to 13 and in the various embodiments described in this patent document. The transmitter 915 transmits or sends information or data to another device. For example, a network device transmitter can send a message to a user equipment. The receiver 920 receives information or data transmitted or sent by another device. For example, a user equipment can receive a message from a network device.

The implementations as discussed above will apply to a wireless communication. FIG. 10 shows an example of a wireless communication system (e.g., a 5G or 6G or NR cellular network) that includes a base station 1020 and one or more user equipment (UE) 1011, 1012 and 1013. In some embodiments, the UEs access the BS (e.g., the network) using a communication link to the network (sometimes called uplink direction, as depicted by dashed arrows 1031, 1032, 1033), which then enables subsequent communication (e.g., shown in the direction from the network to the UEs, sometimes called downlink direction, shown by arrows 1041, 1042, 1043) from the BS to the UEs. In some embodiments, the BS send information to the UEs (sometimes called downlink direction, as depicted by arrows 1041, 1042, 1043), which then enables subsequent communication (e.g., shown in the direction from the UEs to the BS, sometimes called uplink direction, shown by dashed arrows 1031, 1032, 1033) from the UEs to the BS. The UE may be, for example, a smartphone, a tablet, a mobile computer, a machine to machine (M2M) device, an Internet of Things (IoT) device, and so on.

FIG. 11 shows an exemplary flowchart for transmitting a waveform comprising joint communications and sensing signals. Operation 1102 includes transmitting, by a wireless device, a waveform that includes a signal structure having one or more time resources or one or more frequency resources, where the signal structure includes a plurality of data signals, where the signal structure includes a plurality of sensing signal configured to reflect from an object in an area where the wireless device is operating, and where, before the transmitting, the plurality of data signals are spread using different spreading codes than that used to spread the plurality of sensing signals.

FIG. 12 shows an exemplary flowchart for receiving a reflected waveform comprising one or more sensing signals. Operation 1202 includes receiving, by a wireless device, a reflected waveform that is reflected from an object in an area where the wireless device is operating, where the reflected waveform comprises at least some of a plurality of sensing signals in a signal structure transmitted by the wireless device or by another wireless device, and where, prior to the receiving, the wireless device transmits in the signal structure a plurality of data signals that are spread using different spreading codes than that used to spread the plurality of sensing signals.

Figure 13:
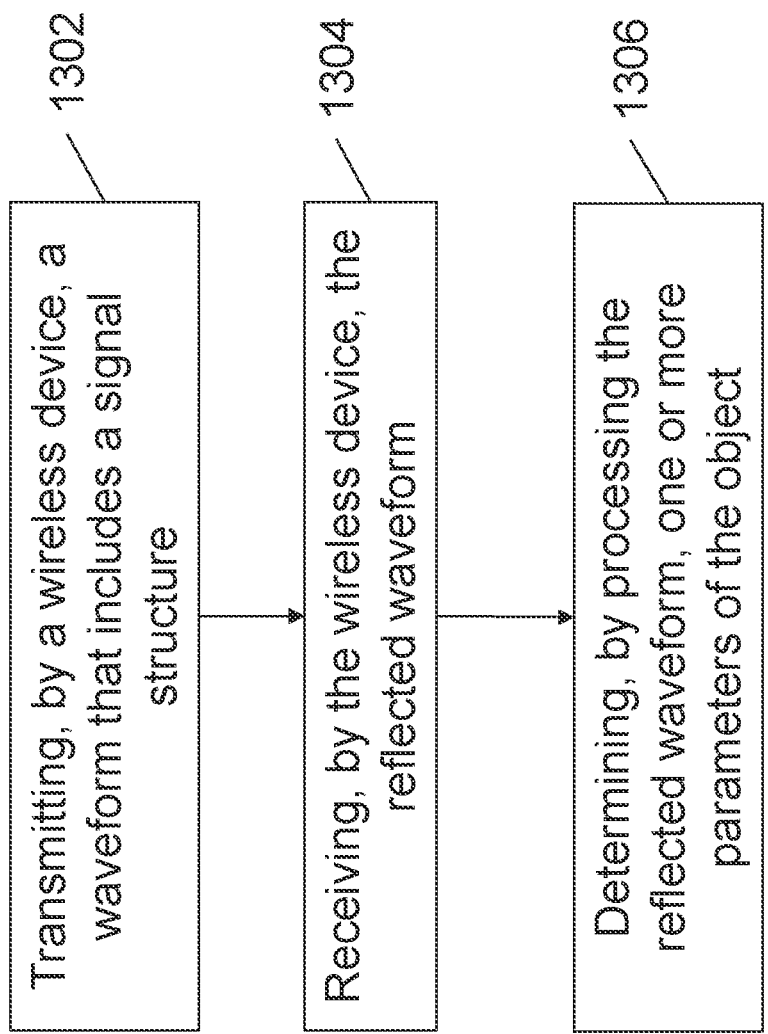
FIG. 13 shows an exemplary flowchart for processing one or more sensing signals in a reflected waveform.

FIG. 13 shows an exemplary flowchart for processing one or more sensing signals in a reflected waveform. Operation 1302 includes transmitting, by a wireless device, a waveform that includes a signal structure, where the signal structure includes a plurality of data signals, where the signal structure includes a plurality of sensing signals configured to reflect from an object in an area where the wireless device is operating resulting in a reflected waveform that comprises at least some of the plurality of sensing signals to be received by the wireless device, and where the plurality of data signals are spread using different spreading codes than that used to spread the plurality of sensing signals. Operation 1304 includes receiving, by the wireless device, the reflected waveform. Operation 1306 includes determining, by processing the reflected waveform, one or more parameters of the object.

In some embodiments, the one or more parameters of the object include a distance between the object and the wireless device, a speed of the object, a motion period of the object, or an image of the object. In some embodiments, the signal structure comprises a plurality of sub-carriers, and a first spreading code selected for a sensing signal is different than a second spreading code selected for a data signal. In some embodiments, a plurality of spreading codes used to spread the plurality of data signals and the plurality of sensing signals are orthogonal. In some embodiments, a plurality of spreading codes used to spread the plurality of data signals and the plurality of sensing signals include a discrete Fourier transform (DFT) matrix, a Hadamard code, a discrete Hartley transform matrix, a discrete cosine transform matrix, or a diagonal matrix. In some embodiments, a plurality of spreading codes used to spread the plurality of data signals and the plurality of sensing signals are non-orthogonal. In some embodiments, a set of spreading codes used to spread the plurality of sensing signals in a plurality of symbols are same.

In some embodiments, at least one symbol for a sensing signal is associated with a first spreading code that is different than a second spreading code associated with another sensing signal in at least one other symbol. In some embodiments, a number of spreading codes used to spread the plurality of sensing signals in a plurality of symbols is same. In some embodiments, at least one symbol for a sensing signal is associated with a first number of spreading codes that are different than a second number of spreading codes associated with another sensing signal in at least one other symbol. In some embodiments, the plurality of sensing signals include frequency modulated continuous wave (FMCW), a pulse signal, or low-correlation sequences. In some embodiments, the low-correlation sequence includes an m-sequence, a pseudo-noise sequence, a gold sequence, or a Zadoff-Chu sequence. In some embodiments, the wireless device includes a network device or a communication device.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer-or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
transmitting, by a wireless device, a waveform that includes a signal structure,
wherein the signal structure includes a plurality of data signals,
wherein the signal structure includes a plurality of sensing signals configured to reflect from an object in an area where the wireless device is operating resulting in a reflected waveform that comprises at least some of the plurality of sensing signals to be received by the wireless device, and
wherein the plurality of data signals are spread using different spreading codes than that used to spread the plurality of sensing signals;
receiving, by the wireless device, the reflected waveform; and
determining, by processing the reflected waveform, one or more parameters of the object.

2. The method of claim 1, wherein the one or more parameters of the object include a distance between the object and the wireless device, a speed of the object, a motion period of the object, or an image of the object.

3. The method of claim 1,
wherein the signal structure comprises a plurality of sub-carriers, and
wherein a first spreading code selected for a sensing signal is different than a second spreading code selected for a data signal.

4. The method of claim 1, wherein a plurality of spreading codes used to spread the plurality of data signals and the plurality of sensing signals are orthogonal.

5. The method of claim 1, wherein a plurality of spreading codes used to spread the plurality of data signals and the plurality of sensing signals include a discrete Fourier transform (DFT) matrix, a Hadamard code, a discrete Hartley transform matrix, a discrete cosine transform matrix, or a diagonal matrix.

6. The method of claim 1, wherein a plurality of spreading codes used to spread the plurality of data signals and the plurality of sensing signals are non-orthogonal.

7. The method of claim 1, wherein a set of spreading codes used to spread the plurality of sensing signals in a plurality of symbols are same.

8. The method of claim 1, wherein at least one symbol for a sensing signal is associated with a first spreading code that is different than a second spreading code associated with another sensing signal in at least one other symbol.

9. The method of claim 1, wherein a number of spreading codes used to spread the plurality of sensing signals in a plurality of symbols is same.

10. The method of claim 1, wherein at least one symbol for a sensing signal is associated with a first number of spreading codes that are different than a second number of spreading codes associated with another sensing signal in at least one other symbol.

11. The method of claim 1, wherein the plurality of sensing signals include frequency modulated continuous wave (FMCW), a pulse signal, or low-correlation sequences.

12. The method of claim 11, wherein the low-correlation sequence includes an m-sequence, a pseudo-noise sequence, a gold sequence, or a Zadoff-Chu sequence.

13. The method of claim 1, wherein the wireless device includes a network device or a communication device.

14. An apparatus for wireless communication comprising at least one processor, configured to implement a method, the at least one processor configured to:

transmit, by a wireless device, a waveform that includes a signal structure,
  wherein the signal structure includes a plurality of data signals,
  wherein the signal structure includes a plurality of sensing signals configured to reflect from an object in an area where the wireless device is operating resulting in a reflected waveform that comprises at least some of the plurality of sensing signals to be received by the wireless device, and
  wherein the plurality of data signals are spread using different spreading codes than that used to spread the plurality of sensing signals;
receive, by the wireless device, the reflected waveform; and
determine, by processing the reflected waveform, one or more parameters of the object.

15. The apparatus of claim 14, wherein the one or more parameters of the object include a distance between the object and the wireless device, a speed of the object, a motion period of the object, or an image of the object.

16. The apparatus of claim 14,
  wherein the signal structure comprises a plurality of sub-carriers, and
  wherein a first spreading code selected for a sensing signal is different than a second spreading code selected for a data signal.

17. The apparatus of claim 14, wherein a plurality of spreading codes used to spread the plurality of data signals and the plurality of sensing signals are orthogonal.

18. The apparatus of claim 14, wherein a plurality of spreading codes used to spread the plurality of data signals and the plurality of sensing signals include a discrete Fourier transform (DFT) matrix, a Hadamard code, a discrete Hartley transform matrix, a discrete cosine transform matrix, or a diagonal matrix.

19. The apparatus of claim 14, wherein a plurality of spreading codes used to spread the plurality of data signals and the plurality of sensing signals are non-orthogonal.

20. The apparatus of claim 14, wherein a set of spreading codes used to spread the plurality of sensing signals in a plurality of symbols are same.

* * * * *